United States Patent
Rodríguez Tsouroukdissian (10) Patent No.: US 9,528,501 B2
(45) Date of Patent: Dec. 27, 2016

(54) FLOATING OFFSHORE WIND TURBINE WITH TUNED MASS DAMPERS

(71) Applicant: ALSTOM RENOVABLES ESPAÑA, S.L., Barcelona (ES)

(72) Inventor: Arturo Rodríguez Tsouroukdissian, Barcelona (ES)

(73) Assignee: ALSTOM RENOVABLES ESPANA, S.L., Barcelona (ES)

( * ) Notice: Subject to any disclaimer, the term of this patent is extended or adjusted under 35 U.S.C. 154(b) by 695 days.

(21) Appl. No.: 13/954,828

(22) Filed: Jul. 30, 2013

(65) Prior Publication Data
US 2014/0079548 A1      Mar. 20, 2014

Related U.S. Application Data

(60) Provisional application No. 61/728,115, filed on Nov. 19, 2012.

(30) Foreign Application Priority Data

Sep. 17, 2012   (EP) ..................................... 12382359

(51) Int. Cl.
   *F03D 11/04*      (2006.01)
(52) U.S. Cl.
   CPC ............... *F03D 11/04* (2013.01); *F03D 13/20* (2016.05); *F03D 80/00* (2016.05); *F05B 2240/93* (2013.01); *F05B 2240/95* (2013.01); *F05B 2250/33* (2013.01); *F05B 2260/96* (2013.01); *Y02E 10/722* (2013.01); *Y02E 10/726* (2013.01)
(58) Field of Classification Search
   CPC ......... F03D 11/00; F03D 11/04; F03D 11/045; F03D 7/0296; Y02E 10/727; F05B 2240/93; F05B 2240/95; F05B 2260/96; F05B 2260/964
   See application file for complete search history.

(56) References Cited

U.S. PATENT DOCUMENTS

| 4,576,520 A * | 3/1986 | Suh ........................ B63B 21/502 |
| | | 114/265 |
| 6,672,837 B1 * | 1/2004 | Veldkamp ................ F03D 11/00 |
| | | 416/144 |
| 2010/0219645 A1 | 9/2010 | Yamamoto et al. |

(Continued)

FOREIGN PATENT DOCUMENTS

| CN | 202 132 184 | 2/2012 |
| KR | 100 972 965 | 7/2010 |
| WO | WO 2011/077053 | 6/2011 |

OTHER PUBLICATIONS

Lackner, Matthew et al. ; Structural Control of Floating Wind Turbines; Dec. 13, 2010.*

(Continued)

*Primary Examiner* — Craig Kim
*Assistant Examiner* — Julian Getachew
(74) *Attorney, Agent, or Firm* — Squire Patton Boggs (US) LLP (57) ABSTRACT

A floating offshore wind turbine comprises a rotor with a plurality of blades, a nacelle and a nacelle support structure having a central longitudinal axis. A plurality of tuned mass damping configurations is arranged around the central longitudinal axis of the nacelle support structure to dampen vibrations in all 6 degrees of freedom.

13 Claims, 9 Drawing Sheets

(56) References Cited

U.S. PATENT DOCUMENTS

2011/0150631 A1   6/2011   Choi et al.

OTHER PUBLICATIONS

European Search Report for EP 12382359, mailed Feb. 14, 2013, 7 pgs.
Stewart "Load Reduction of Floating Wind Turbines Using Tuned Mass Dampers", Thesis, Chapter 3.1, pp. 28-36 (2012).

* cited by examiner

FLOATING OFFSHORE WIND TURBINE WITH TUNED MASS DAMPERS

This application claims the benefit of European Patent Application No. 12382359.3 filed on Sep. 17, 2012 and U.S. Provisional Patent Application Ser. No. 61/728,115 filed on Nov. 19, 2012, the disclosures of which are hereby incorporated by references in their entirety for all purposes.

The present invention relates to floating offshore wind turbines.

BACKGROUND ART

Offshore wind turbines are being developed that instead of resting on fixed-bottom support structures have a floating support structure.

Several configurations have been proposed for the floating or buoyancy structures: many of these employ floater elements in the form of hollow floater tanks that in use are arranged substantially below the mean sea level and provide a buoyancy force to support the wind turbine. Ballast and/or mooring lines anchored to the seabed are provided for achieving stability.

In some of these floating wind turbines, the buoyancy structure is designed to provide an excess buoyancy force and is maintained floating under the mean sea level by taut mooring lines tensioned by the excess buoyancy force.

For example, concepts have been developed such as the "Taught Leg Buoy" (TLB) floating wind turbine, with a slender cylindrical buoy and at least two tensioned mooring lines, inclined relative to the seabed and connected to gravity anchors and to the buoy; or such as the "Tension Leg Platform" (TLP) floating wind turbine, in which the tensioned mooring lines are substantially vertical and are connected between gravity anchors on the seabed and arms or braces extending radially outwards with respect to the vertical axis of the wind turbine. The TLP arms may be part of the buoyancy structure, for example in the form of hollow spokes that extend radially outward from a hollow central hub, or may be arranged above the sea level, in which case the buoy may be a slender cylindrical tank like in the TLB concept.

The buoyancy structures of a floating offshore wind turbine (FOWT) is subject to several loads, such as for example the weight of the wind turbine itself, impacts, forces exerted by waves, currents and tides, and, depending on the configuration of the wind turbine, also aerodynamic forces associated with the wind, rotor rotation, etc. In the presence of such loads floating wind turbines may have a tendency to destabilize.

Furthermore, floating offshore wind turbines compared to their fixed substructure counterparts i.e. the monopile, jacket, tripod, or gravity based, may have a completely different dynamic response. Offshore wind turbines are highly dependent on the boundary conditions established by the water in which they reside and by the cables anchored to the seabed. On the one hand, these types of buoyancy structures are subject to relatively large displacements at the tower base (surge, sway, heave), which may affect the dynamic response of the nacelle-rotor-assembly due to elevated accelerations. On the other hand, they are subject to relatively large rotations (roll, pitch, yaw) at the tower base, which may compromise the structural integrity of both the buoyancy structure and the tower, with the danger of ultimate collapse.

The aforementioned loads may cause a FOWT to oscillate. In order to stabilize a FOWT with such a buoyancy structure, several solutions are possible. One example solution is to reinforce the buoyancy structure by adding ballast at the bottom of the floater tanks. Another example is to provide extra mooring lines which are put under tension by providing an excess buoyancy to the floater tanks. A combination of both solutions is also possible. However, these solutions increase material significantly. As the weight of the buoyancy structure goes up, so does the cost of manufacture and installation.

Alternative known strategies to reduce oscillations in a FOWT are based on the mitigation of loads by means of an optimized control of the wind turbine. In particular, it is known to pitch the wind turbine blades, so that certain loads (e.g. wind thrust acting on the rotor) are reduced. Nevertheless, these strategies have limited effect and can only mitigate oscillations resulting from some specific forces (not all).

It would be desirable to provide a floating offshore wind turbine in which the above mentioned drawbacks are at least partly solved.

SUMMARY

This disclosure relates to floating offshore wind turbines comprising a rotor with a plurality of blades, a nacelle and a nacelle support structure. The nacelle support structure comprises at least a wind turbine tower and a buoyancy structure intended to provide a buoyancy force to support the wind turbine. The nacelle support structure may have a central longitudinal axis. The wind turbine tower and the buoyancy structure may share said central longitudinal axis.

According to a first aspect of the invention, a plurality of tuned mass damping configurations may be arranged radially outward from the central longitudinal axis of the nacelle support structure of a floating offshore wind turbine. The plurality of tuned mass damping configurations may be attached to the nacelle support structure.

In some embodiments each tuned mass damping configuration may be arranged along a line corresponding to a radius of the nacelle support structure, perpendicular to the central longitudinal axis. The corresponding lines of all tuned mass damping configurations may belong to the same plane.

In some embodiments each tuned mass damping configuration may comprise at least one tuned mass damper. A tuned mass damper, also known as a harmonic absorber, is a device mounted in structures to reduce the amplitude of mechanical vibrations. Their application can prevent discomfort, damage, or outright structural failure. Tuned mass dampers stabilize against violent motion caused by harmonic vibration. A tuned mass damper reduces the vibration of a system with a comparatively lightweight component so that the worst-case vibrations are less intense. Systems employing tuned mass dampers are tuned to either move the main mode away from a troubling excitation frequency, or to add damping to a resonance that is difficult or expensive to damp directly.

Each tuned mass damper may comprise at least a mass and a plurality of damping elements. The mass may be suspended from at least one fixed point of the nacelle support structure. Each damping element of the plurality of damping elements is attached at one point to the mass and at least one other point to a fixed point of the nacelle support structure.

In some embodiments each tuned mass damping configuration may comprise a plurality of tuned mass dampers. The plurality of tuned mass dampers of each tuned mass damping configuration may have a center of gravity along the line where the respective tuned mass damping configuration is arranged. When a plurality of tuned mass dampers is employed as part of a mass damping configuration smaller masses are required to dampen the same amount of force and the harmonics of the oscillations are better controlled.

In some embodiments each tuned mass damping configuration may further comprise a container for enclosing the one or more tuned mass dampers. The container may be attached to the nacelle support structure and each tuned mass damper may be attached to the inner walls of the container. Such a container may protect the tuned mass damper from corrosion.

The tuned mass damping configurations may be internal or external to the nacelle support structure. The tuned mass damping configurations may be attached to the internal walls of the nacelle support structure or around an internal platform of the nacelle support structure. In some embodiments the nacelle support structure may further comprise a plurality of braces extending radially outward from a transition piece arranged between the wind turbine tower and the buoyancy structure. Each tuned mass damping configuration may then be attached internally or externally to a brace, either on top of, or below, or at a distal end of the brace, respectively.

In some embodiments the tuned mass damping configuration may be passive and in others may be active or semi-active. In some embodiments the damping element of the tuned mass damping configuration may simply comprise a resilient chain or rope. In other embodiments the damping element may be a hydraulic damper.

In embodiments employing an active or semi-active damping element, the offshore wind turbine further comprises one or more sensors, wherein data collected by the sensors is used in the control of the active or semi-active tuned mass damper. A semi-active damping element may be a magnetorheological fluid damper or an electrorheological fluid damper.

One skilled in the art may appreciate that any kind of damping device (e.g. hydraulic, pneumatic, solid friction, rotational inertia-viscous dampers, rotational friction dampers etc.) may be used within the scope of the present invention.

A passive damper system generally has a non-variable (constant) damping coefficient. In a semi-active damper system, the damping coefficient may be varied with a control system. In an active damper system, the damping device is actively steered, e.g. by increasing or decreasing pressure in a fluid chamber. A semi-active damper system may be formed e.g. by a variable-orifice viscous damper, a variable stiffness damper, a variable-friction damper or a controllable fluid damper. A preferred controllable fluid damper is a magnetorheological fluid damper. In magnetorheologial fluid dampers, the damper fluid contains metallic particles. The damper's damping coefficient can be controlled very quickly by an electro-magnet. A control system may thus send control signals to an electro-magnet which can increase or decrease the damping coefficient. An aspect of semi-active and active dampers is that they may be controlled to adapt to instantaneous load conditions. For example, under a high or sudden aerodynamic or hydrodynamic load, the dampers' damping coefficient may be suitably adapted.

Another controllable fluid damper that may advantageously be used is e.g. an electrorheological fluid damper. Electrorheological fluids are suspensions of fine particles in an electrically insulating fluid. The viscosity of these fluids may be changed reversibly and very quickly in response to an electric field. In such a damper, the friction coefficient can thus be varied by applying an electric field.

In some embodiments the offshore wind turbine may comprise n tuned mass damping configurations having a n-fold rotational symmetry. For example, an offshore wind turbine that may comprise three tuned mass damping configurations may have a 3-fold rotational symmetry.

In some embodiments the offshore wind turbine may further comprise a tuned mass damping configuration along the central longitudinal axis and/or a tuned mass damping configuration at the nacelle for damping oscillations induced to the nacelle by the rotating blades.

Additional objects, advantages and features of embodiments of the invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION OF EMBODIMENTS

Figure 1:
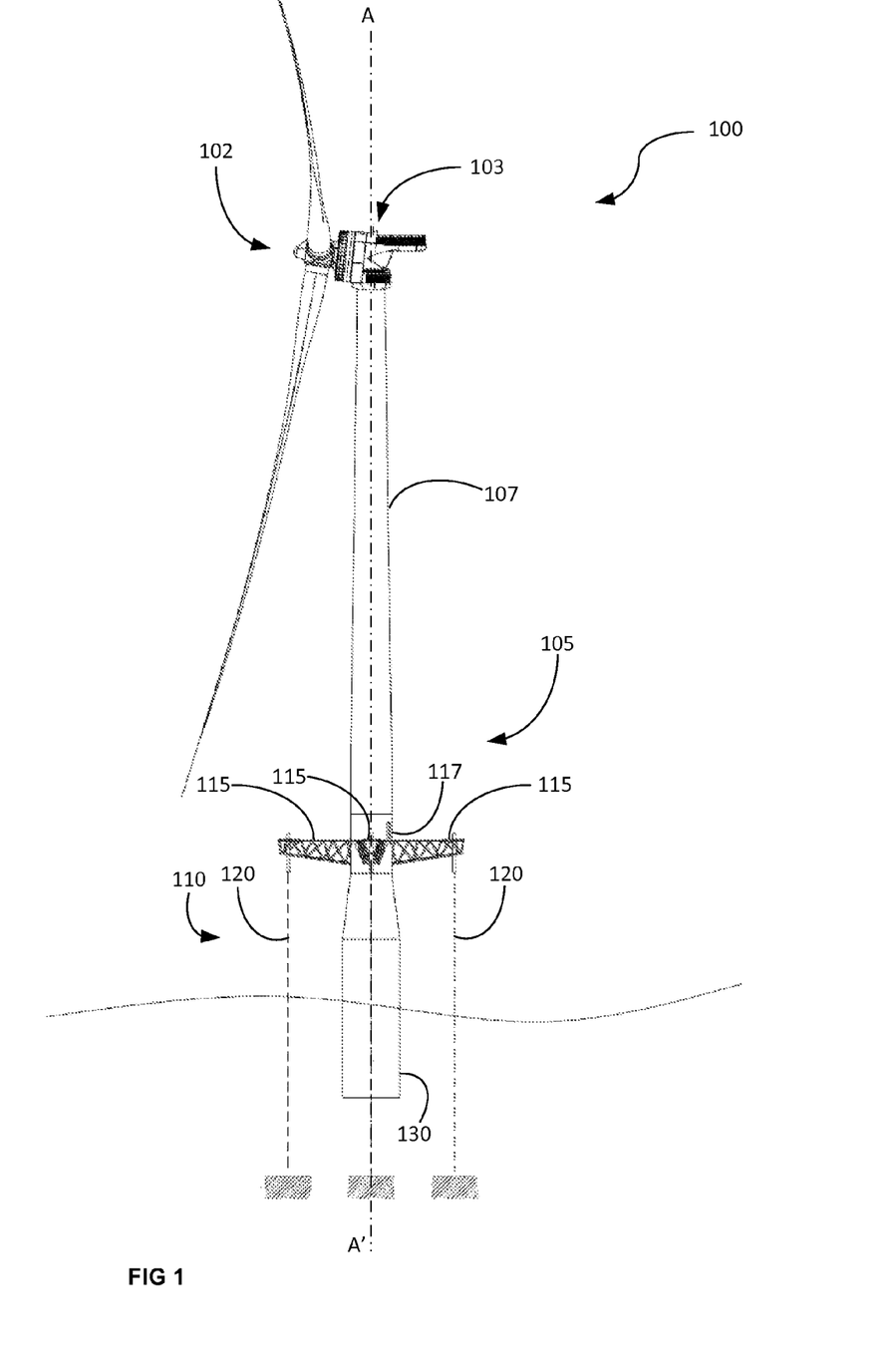
FIG. 1 shows schematically a side view of a floating offshore wind turbine in which embodiments of the present invention may be applied.

FIG. 1 shows a floating offshore wind turbine, and more particularly a floating wind turbine of the TLP (Tension Leg Platform) type.

The offshore wind turbine 100 comprises rotor 102 having a plurality of blades, nacelle 103 and nacelle support structure 105. Nacelle support structure comprises wind turbine tower 107 and buoyancy structure 110, with at least one floater tank 130. Nacelle support structure 105 has a central longitudinal axis A-A'.

The buoyancy structure 110 may be designed such as to remain submerged in a position above the sea bed SB and below the mean sea level MSL, to provide an upward thrust for supporting the weight of the wind turbine and other loads. The floater tank 130 may have a substantially cylindrical shape, such as shown in FIG. 1, and may have a diameter that is smaller than its length. For example, the floater tank 130 may be around 20 m in length and have a diameter of between 6 and 12 m. This kind of buoyancy structures are sometimes referred to as "spar-buoy".

The floater tank 130 may have a central geometric axis (here the vertical axis of the cylinder), and the floater tank may be arranged such that this axis is substantially or generally aligned with the axis of the wind turbine tower, i.e. the cylindrical floater tank 130 may be arranged substantially under the wind turbine, as shown. It may be apparent that the central geometric axis of floater tank 130 and of wind turbine tower 107 substantially coincides with the central longitudinal axis of nacelle support structure 105.

The nacelle support structure may be provided with three braces 115, extending radially outward from a wind turbine transition structure 117, at a height above the mean sea level; a mooring line 120 may be attached to each of the braces 115 at one end and to the seabed at the other end. The transition structure 117 is arranged between the buoyancy structure and the tower of the wind turbine; in some configurations, such a transition structure is known as "transition piece".

Further mooring lines (not shown) may be arranged between the lower end of the floater tank and the sea bed, and/or mooring lines 120 may be attached to the sea bed in such positions as to be inclined instead of vertical.

Figure 2:
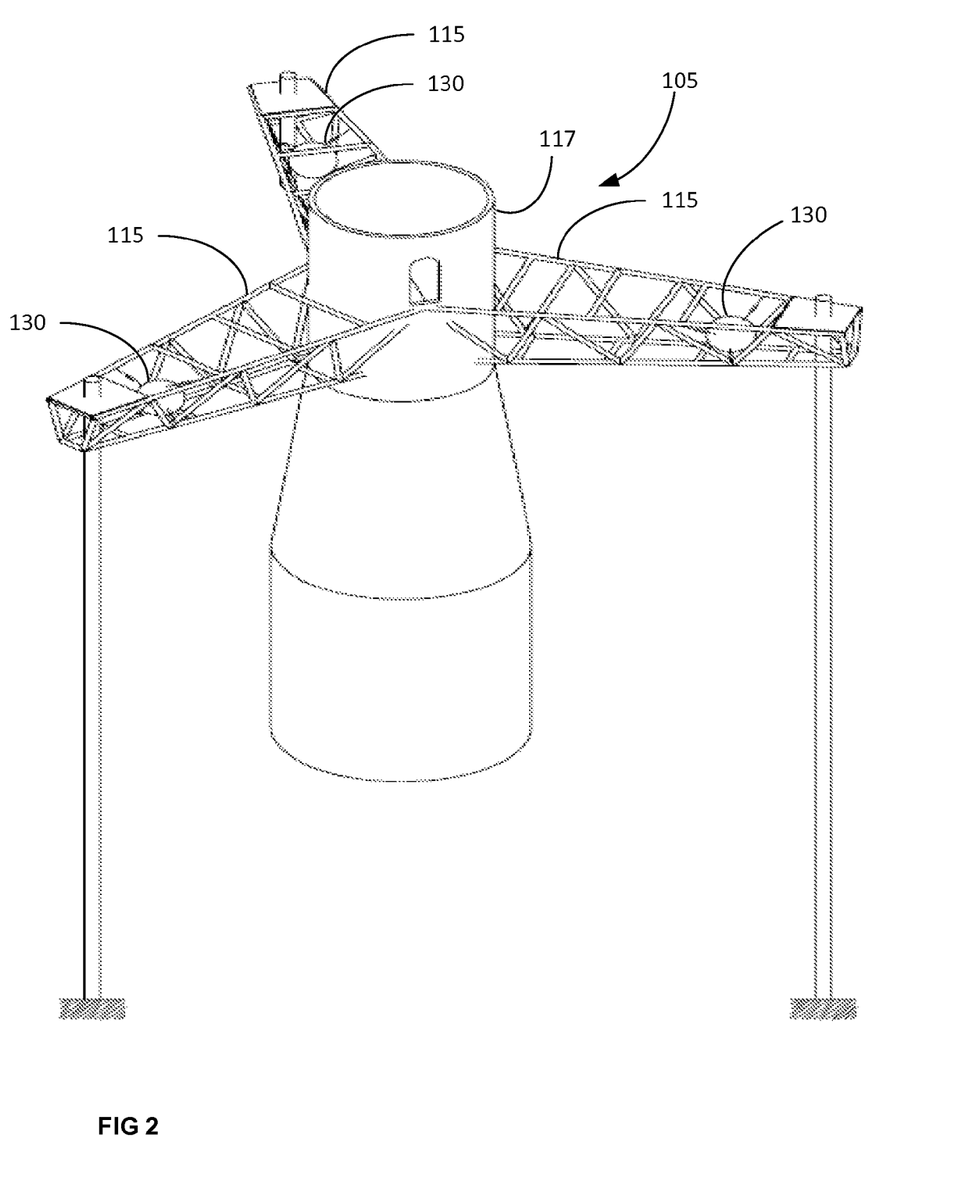
FIG. 2 shows schematically in perspective view a detail of a floating offshore wind turbine to which a plurality of tuned mass damping configurations has been applied, according to an embodiment.
Figure 3:
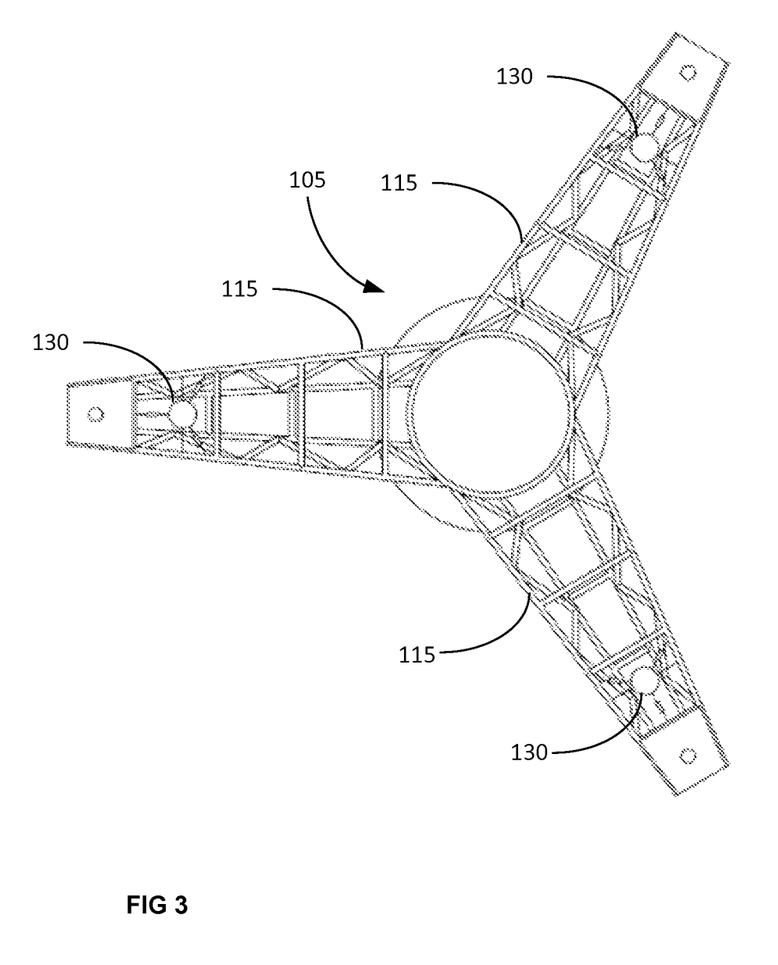
FIG. 3 shows schematically in aerial cross section a detail of a floating offshore wind turbine to which a plurality of tuned mass damping configurations has been applied, according to an embodiment.

FIGS. 2 and 3 show schematically in perspective and aerial cross section view, respectively, a detail of a floating offshore wind turbine to which a plurality of tuned mass damping configurations 130 has been applied, according to an embodiment. In the examples of FIGS. 2 and 3, three tuned mass damping configurations have been employed, one in each of braces 115 extending outwards from transition structure 117 of nacelle support structure 105. The plurality of tuned mass damping configurations 130 of FIGS. 2 and 3 constitutes a damping structure that may have rotational symmetry. In the example with three tuned mass damping configurations there may be 3-fold rotational symmetry. In the embodiment of FIGS. 2 and 3, each tuned mass damping configuration employs one tuned mass damper such as the one shown in FIG. 3A. In use, the plurality of tuned mass damping configurations may be arranged in order to dampen oscillations due to external and/or internal forces in all six degrees of freedom of the floating offshore wind turbine. Such forces may be due to waves, wind or rotation of the blades of the floating offshore wind turbine. Whenever such a force is applied to the FOWT, at least one tuned mass damping configuration is displaced in such a way as to counteract any oscillations that are caused by the applied force.

Figure 3A:
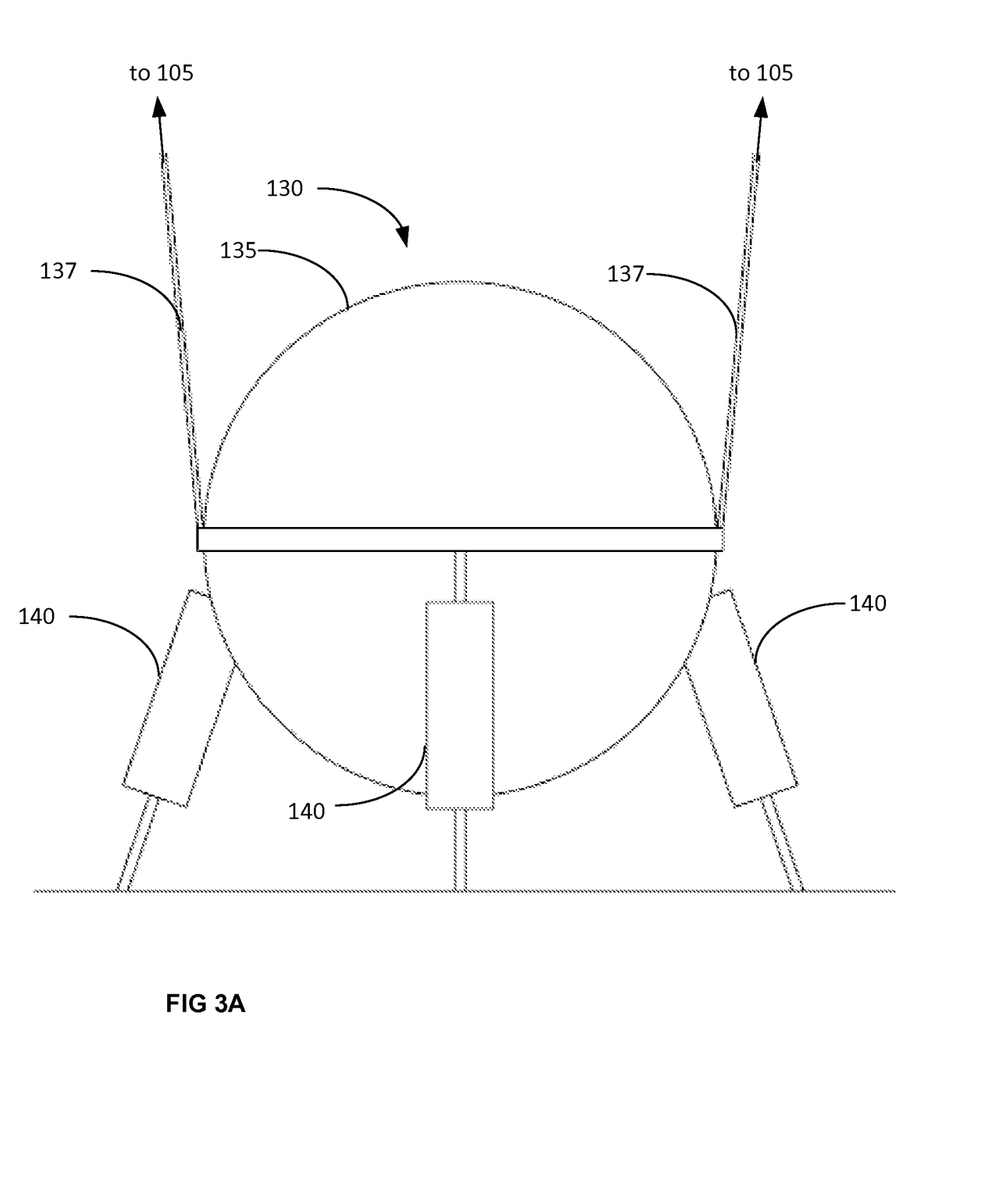
FIG. 3A shows schematically an example of a tuned mass damper that may be applied to embodiments of the present invention.

FIG. 3A shows schematically an example of a tuned mass damper that may be applied to embodiments of the present invention. Each tuned mass damper may comprise mass 135 and a plurality of damping elements 140. In the example of FIG. 3, 3 damping elements 140 are employed. Furthermore, each mass may be suspended from fixed points of the nacelle support structure using suspension ropes or chains 137. When suspension ropes or chains 137 are vertical, they may be selected with a certain degree of flexibility to allow vertical displacement of the mass. Each damping element 140 may be attached at one end to mass 135 and at the other end to a fixed point of nacelle support structure 105. The damping elements may be arranged perpendicular to the mass. Each damping element may belong to two notional planes. Each notional plane may be formed by two damping elements. Thus, when 3 damping elements are employed, three notional planes may be formed by the 3 damping elements. In that case, the three notional planes may be arranged with 120 degrees angular inclination between each other.

Each tuned mass damping configuration may also comprise one or more containers for protecting the tuned mass dampers from corrosion. In such a case the containers may be attached to the nacelle support structure or to a platform connected to the nacelle support structure. The tuned mass dampers may be attached to the inner walls of their respective containers.

Whenever a force is applied to the FOWT, at least one mass of a tuned mass damping configuration is displaced to counteract the applied force.

Figure 4:
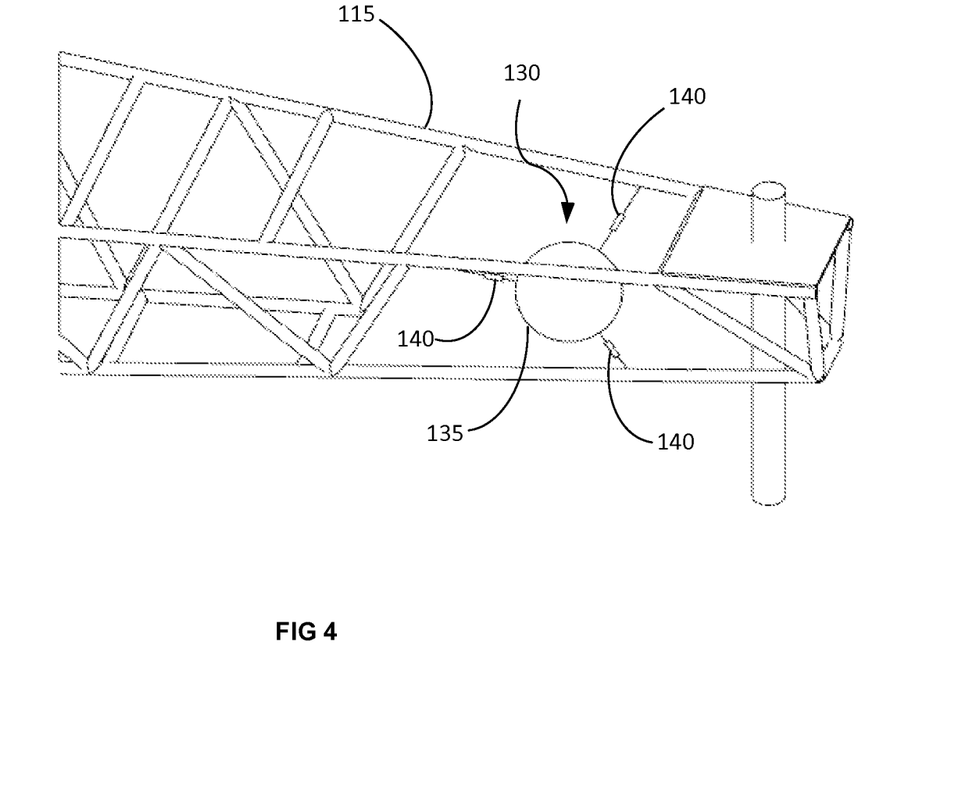
FIG. 4 shows schematically in perspective view a detail of a brace to which a tuned mass damping configuration has been applied, according to an embodiment.

FIG. 4 shows schematically in perspective view a detail of a brace 115 to which a tuned mass damping configuration 130 has been applied. In the embodiment of FIG. 4, brace 115 is a metal mesh structure. The metal mess structure is comprised of metal beams. Tuned mass damping configuration 130 of FIG. 4 comprises mass 135 and three damping elements 140. Each damping element is attached to a beam of the brace. The tuned mass damping configuration of FIG. 4 is arranged inside the brace, towards the distal part of the brace. The advantage of placing tuned mass damping configuration 130 towards the distal part of the brace is that, the farther from the central longitudinal axis a tuned mass damping configuration is placed, the smaller mass is required to be displaced to counteract the same yawing force. In other words, yaw forces are better suppressed as masses are placed farther from the central longitudinal axis of the nacelle support structure. Furthermore, distal placement of tuned mass damping configurations allows better suppression of localized mooring lines tension fluctuations.

Figure 5:
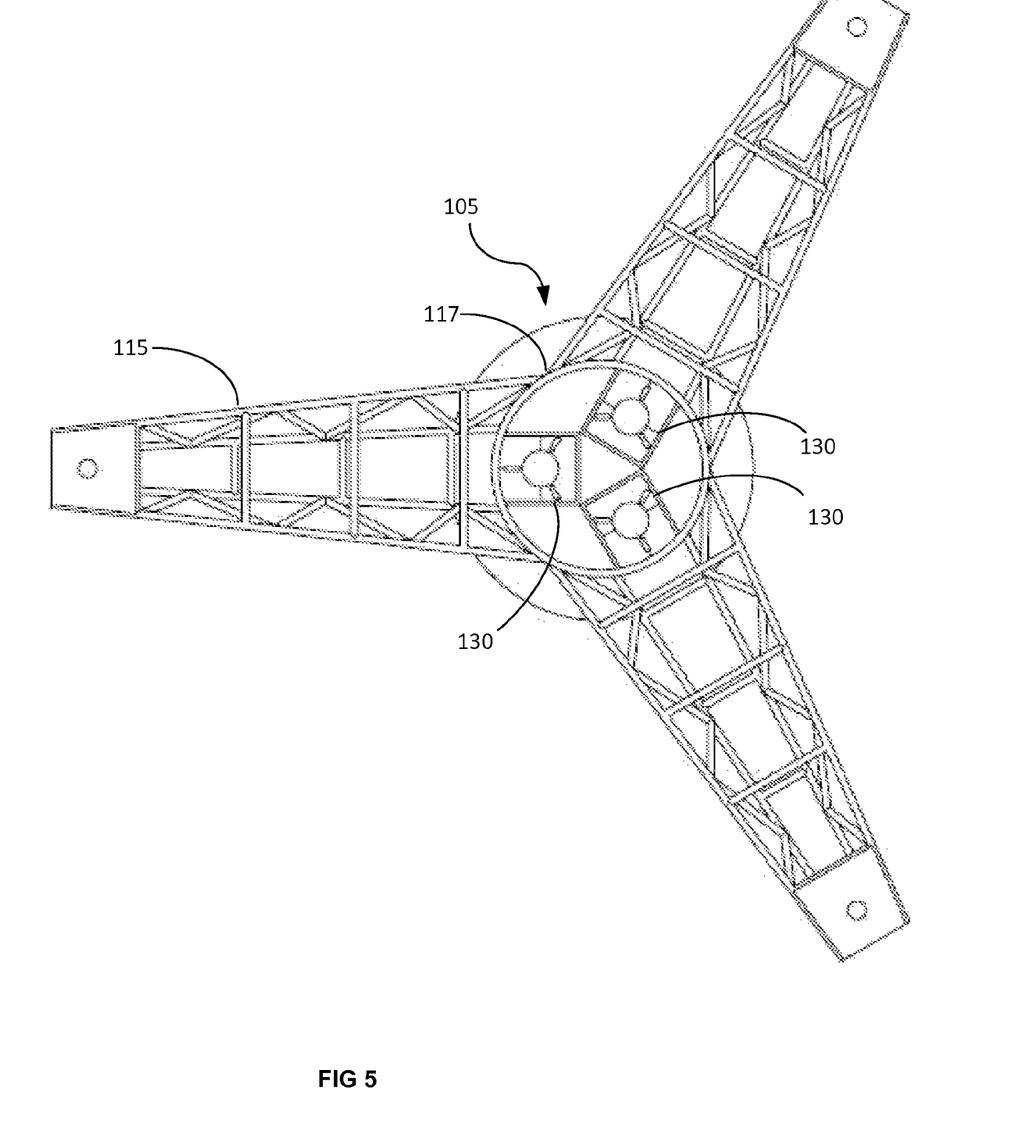
FIG. 5 shows schematically in aerial cross section a detail of a floating offshore wind turbine to which a plurality of tuned mass damping configurations has been applied inside the wind turbine transition structure, according to an embodiment.

FIG. 5 shows schematically in aerial cross section a detail of a floating offshore wind turbine to which a plurality of tuned mass damping configurations 130 has been applied inside nacelle support structure 105. More particularly, in the example of FIG. 5, 3 tuned mass damping configurations 130 are arranged inside transition structure 117. One skilled in the art may appreciate that a similar configuration may also be possible inside wind turbine tower 107. Each tuned mass damping configuration 130 comprises a container and a tuned mass damper, similar to the one depicted in FIG. 3A. The containers are arranged in a 3-fold rotational symmetry around the central longitudinal axis of nacelle support structure 105. Each tuned mass damper comprises a mass and three damping elements. Each damping element is attached at one end to its corresponding mass and to the other end to a wall of its corresponding container. By placing the tuned mass damping configurations inside the transition structure they are better protected from weather and they are more easily accessible for installation and maintenance.

Figure 6:
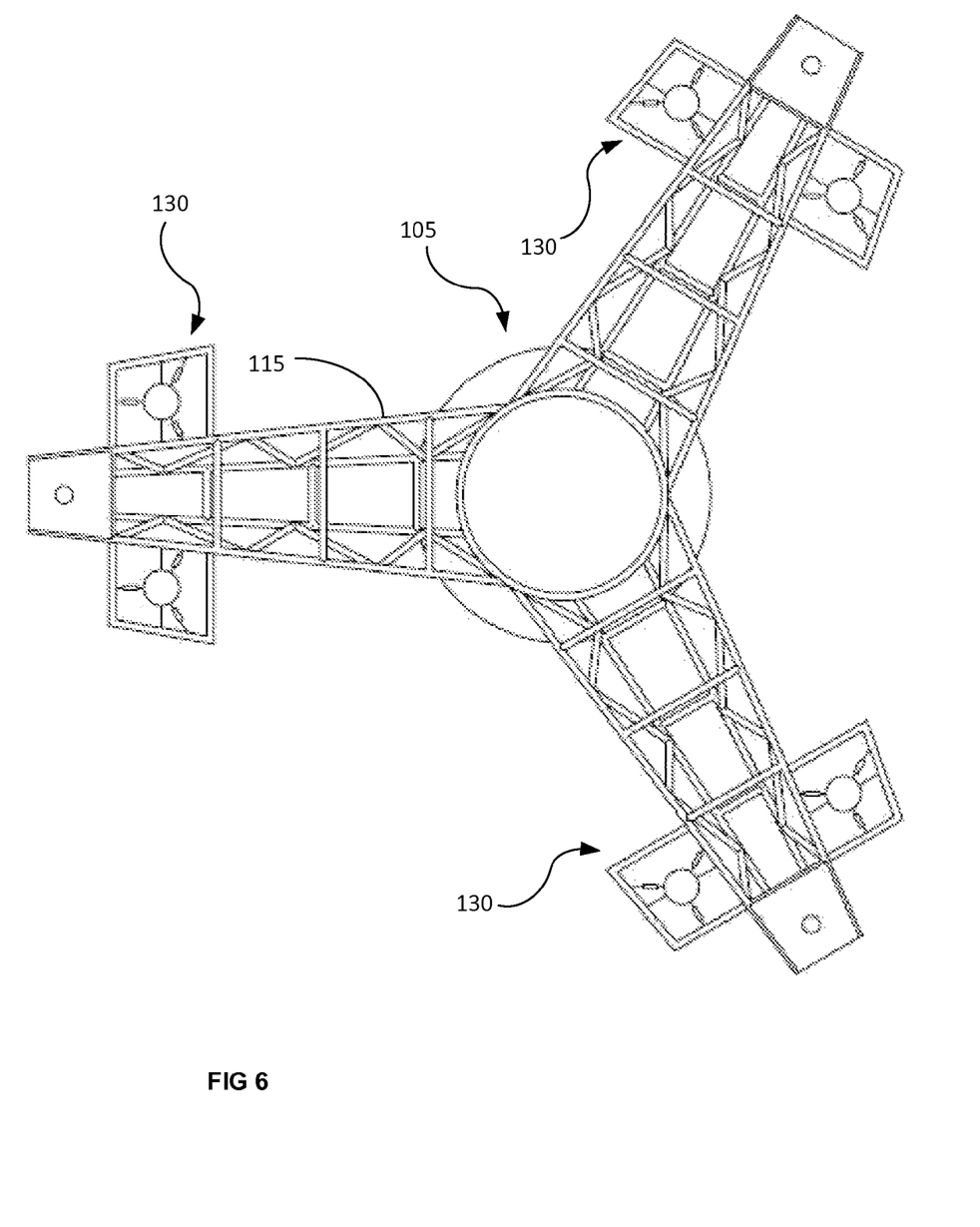
FIG. 6 shows schematically in aerial cross section a detail of a floating offshore wind turbine to which a plurality of tuned mass damping configurations has been applied around the braces, according to an embodiment.

FIG. 6 shows schematically in aerial cross section a detail of a floating offshore wind turbine to which a plurality of tuned mass damping configurations 130 has been applied around braces 115, according to an embodiment. Each tuned mass damping configuration comprises 2 containers, each container including a tuned mass damper. Each container is arranged on a lateral side of its respective brace. Each container is attached to its respective brace externally. The 2 containers of each tuned mass damping configuration are placed symmetrically to their respective brace. An aspect of having more than one tuned mass damper as part of a tuned mass damping configuration is that smaller masses may be used to counteract a force and that more forces may be controlled individually.

The tuned mass damping configurations of FIG. 6 are arranged on the lateral sides of the braces. However, one skilled in the art may appreciate that similar arrangements may be placed above and below the braces. Furthermore, each tuned mass damping configuration may comprise more than two tuned mass dampers, provided that certain symmetry is maintained. Tuned mass damping configurations may thus relatively easily be added to already existing structures.

Figure 7:
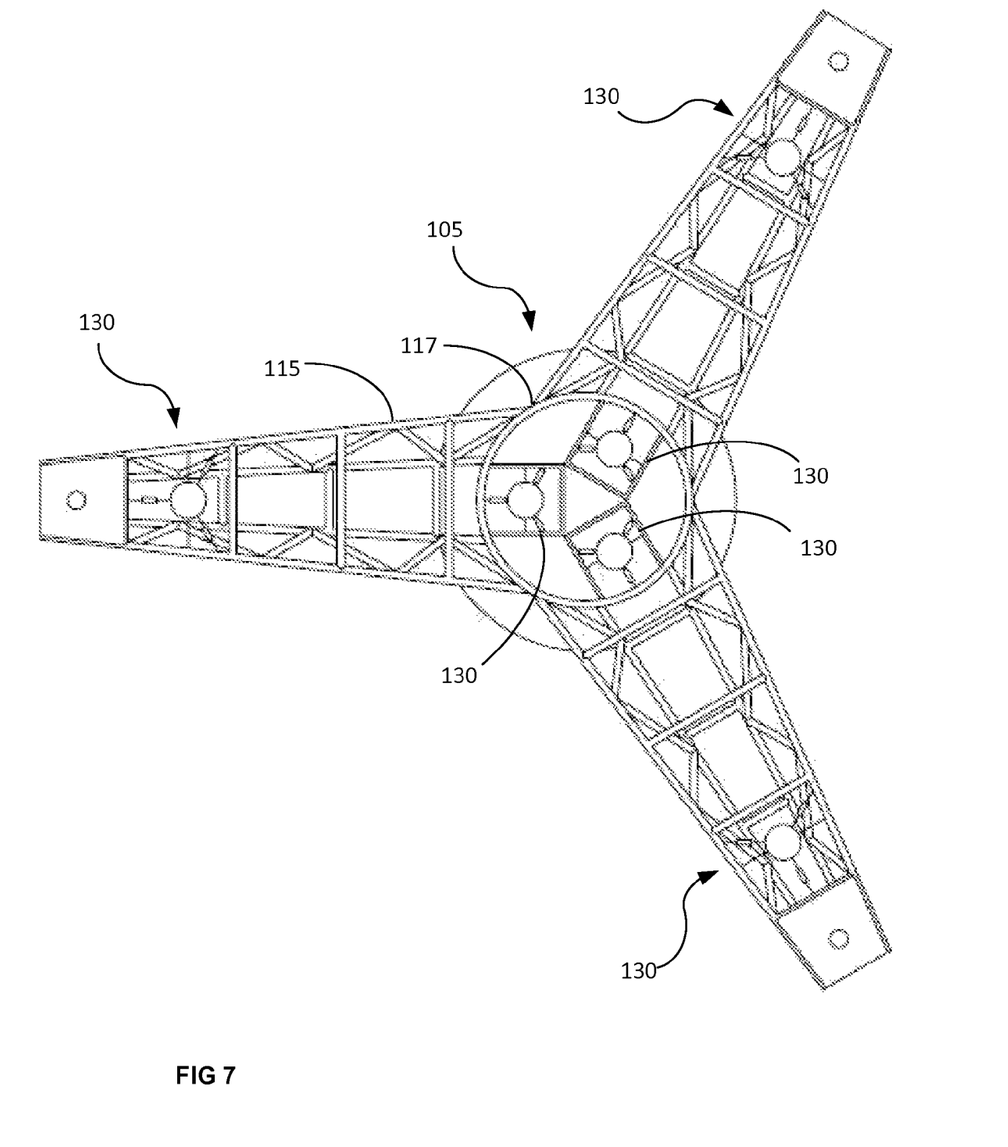
FIG. 7 shows schematically in aerial cross section a detail of a floating offshore wind turbine to which a plurality of tuned mass damping configurations has been applied both inside the wind turbine transition structure and inside the braces, according to an embodiment.

FIG. 7 shows schematically in aerial cross section a detail of a floating offshore wind turbine to which a plurality of tuned mass damping configurations has been applied both inside the wind turbine tower and inside the braces, according to an embodiment. In the example of FIG. 7, 3 tuned mass damping configurations are placed inside transition structure 117 and 3 tuned mass damping configurations are placed one in each of braces 115. An aspect of such an arrangement is that smaller masses may be used to control individual forces applied to the FOWT.

Figure 8:
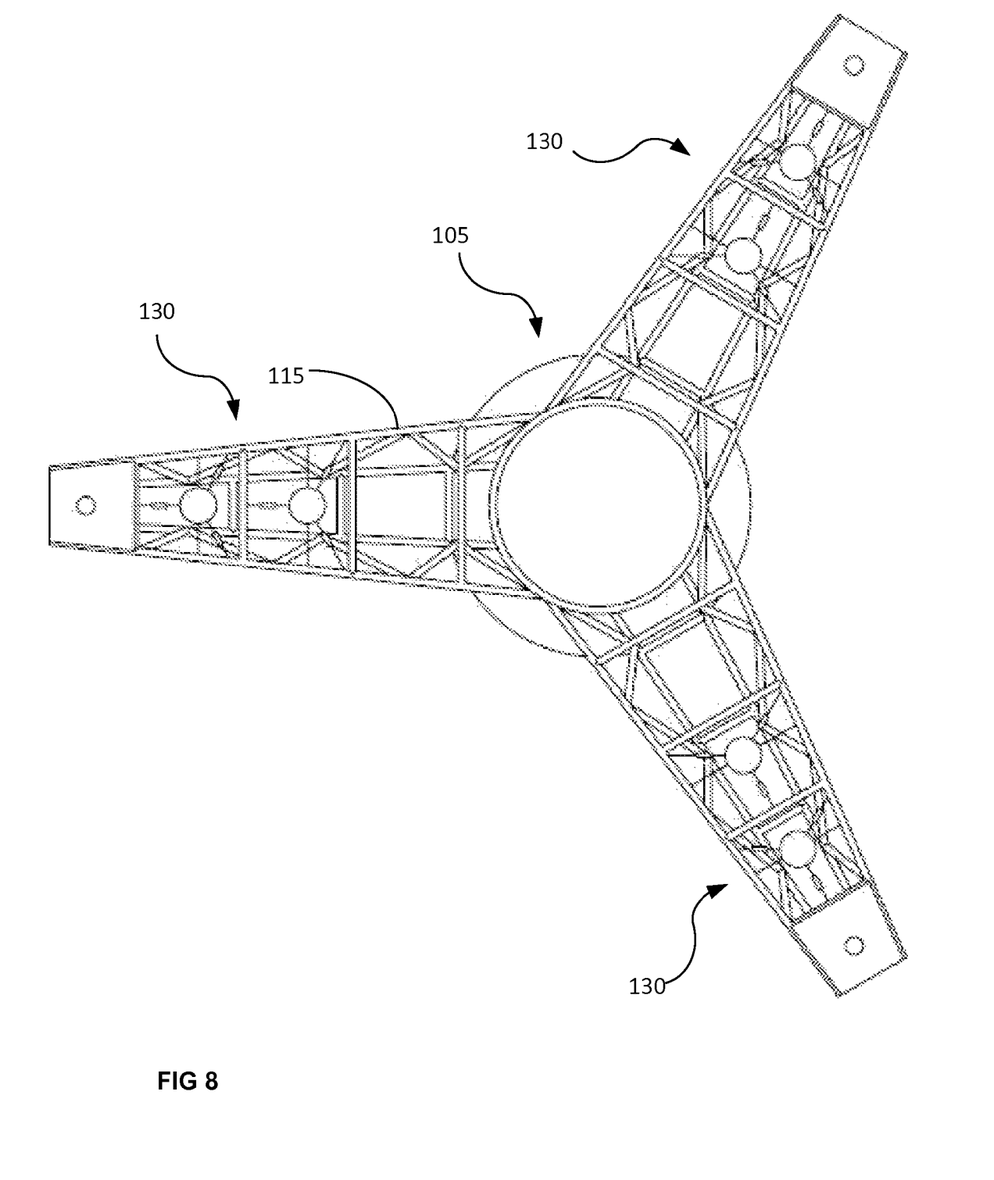
FIG. 8 shows schematically in aerial cross section a detail of a floating offshore wind turbine to which a plurality of tuned mass damping configurations has been applied in series inside the braces, according to an embodiment.

FIG. 8 shows schematically in aerial cross section a detail of a floating offshore wind turbine to which a plurality of tuned mass damping configurations 130 has been applied in series inside braces 115, according to an embodiment. Tuned mass damping configurations 130 are arranged along an axial line of each brace perpendicular to the central longitudinal axis of nacelle support structure 105. The advantage of such an arrangement is that higher forces may be controlled with smaller masses. Also, size constrains of braces 115 may limit the size and weight of individual masses within each tuned mass damper.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A floating offshore wind turbine, comprising:
a rotor with a plurality of blades,
a nacelle, and
a nacelle support structure,
the nacelle support structure comprising at least a wind turbine tower and a buoyancy structure,
the nacelle support structure having a central longitudinal axis,
wherein a plurality of tuned mass damping configurations is arranged radially outward from the central longitudinal axis and attached to the nacelle support structure, and
the nacelle support structure further comprising a transition structure arranged between the wind turbine tower and the buoyancy structure, and a plurality of braces extending radially outward from the transition structure,
wherein one tuned mass damping configuration is placed inside each brace.

2. The offshore wind turbine according to claim 1, wherein each tuned mass damping configuration is arranged along a line corresponding to a radius of the nacelle support structure, perpendicular to the central longitudinal axis, wherein all lines belong to the same plane.

3. The offshore wind turbine according to claim 2, wherein each tuned mass damping configuration comprises at least one tuned mass damper.

4. The offshore wind turbine according to claim 3, wherein the at least one tuned mass damper comprises at least a mass and a plurality of damping elements.

5. The offshore wind turbine according to claim 3, wherein each tuned mass damping configuration comprises a plurality of tuned mass dampers.

6. The offshore wind turbine according to claim 5, wherein the plurality of tuned mass dampers of each tuned mass damping configuration has a center of gravity along the line where the respective tuned mass damping configuration is arranged.

7. The offshore wind turbine according to claim 3, wherein each tuned mass damping configuration further comprises a container for enclosing the at least one tuned mass damper, wherein the container is attached to the nacelle support structure and the at least one tuned mass damper is attached to a wall of the container.

8. The offshore wind turbine according to claim 1, wherein at least a portion of the tuned mass damping configurations is internal to the nacelle support structure and attached to the transition structure or to an internal platform of the transition structure.

9. A floating offshore wind turbine, comprising:
a rotor with a plurality of blades,
a nacelle, and
a nacelle support structure,
the nacelle support structure comprising at least a wind turbine tower and a buoyancy structure,
the nacelle support structure having a central longitudinal axis and
wherein a plurality of tuned mass damping configurations is arranged radially outward from the central longitudinal axis and attached to the nacelle support structure;
wherein the tuned mass damping configurations are external to the nacelle support structure;
wherein one of the tuned mass damping configurations is placed outside of, on top of, below or at a distal end of a brace; and
wherein each tuned mass damping configuration comprises a plurality of tuned mass dampers arranged around a respective brace, each tuned mass damping configuration having a center of gravity along a radial line of the respective brace.

10. The offshore wind turbine according to claim 1, wherein at least one tuned mass damping configuration is passive.

11. The offshore wind turbine according to claim 1, wherein at least one tuned mass damping configuration is active or semi-active.

12. The offshore wind turbine according to claim 1, wherein the offshore wind turbine comprises n tuned mass damping configurations having an n-fold rotational symmetry, where n is a natural number of two or more.

13. The offshore wind turbine according to claim 1, further comprising a tuned mass damping configuration along the central longitudinal axis and/or at the nacelle.

* * * * *